Jan. 27, 1959 C. E. SMITH 2,871,147
METHOD OF REFINING STARCH HYDROLYZATE LIQUORS
Filed Nov. 24, 1954 4 Sheets-Sheet 1
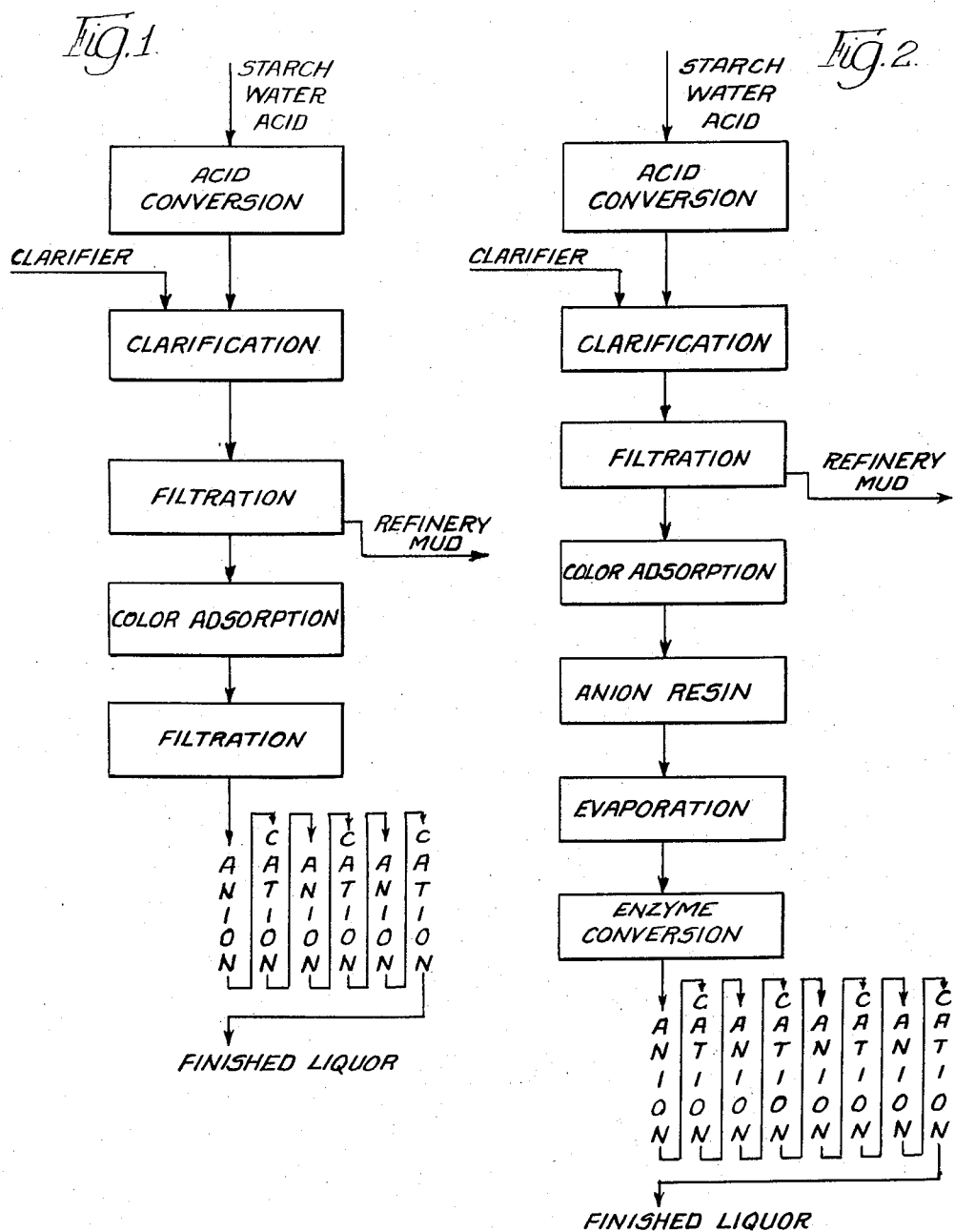

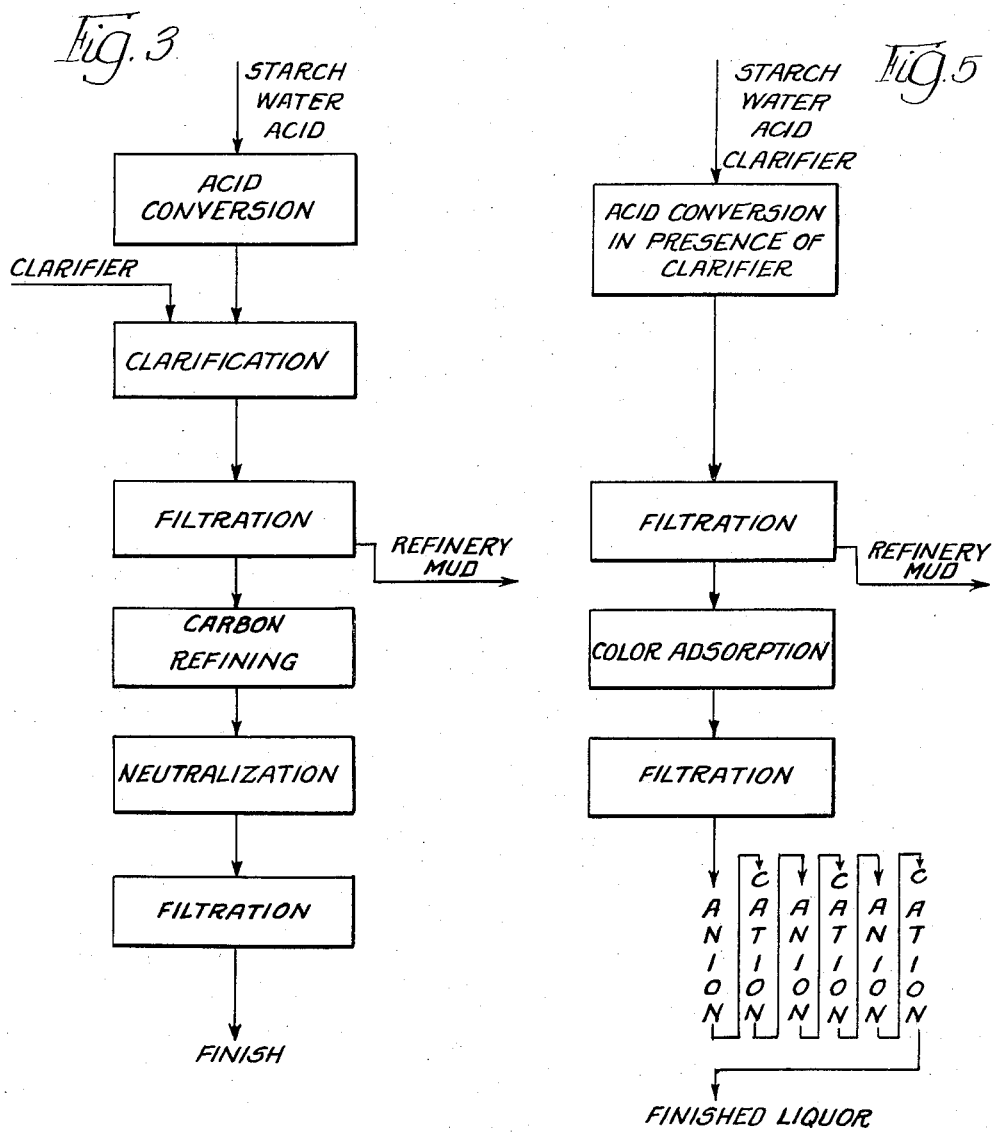

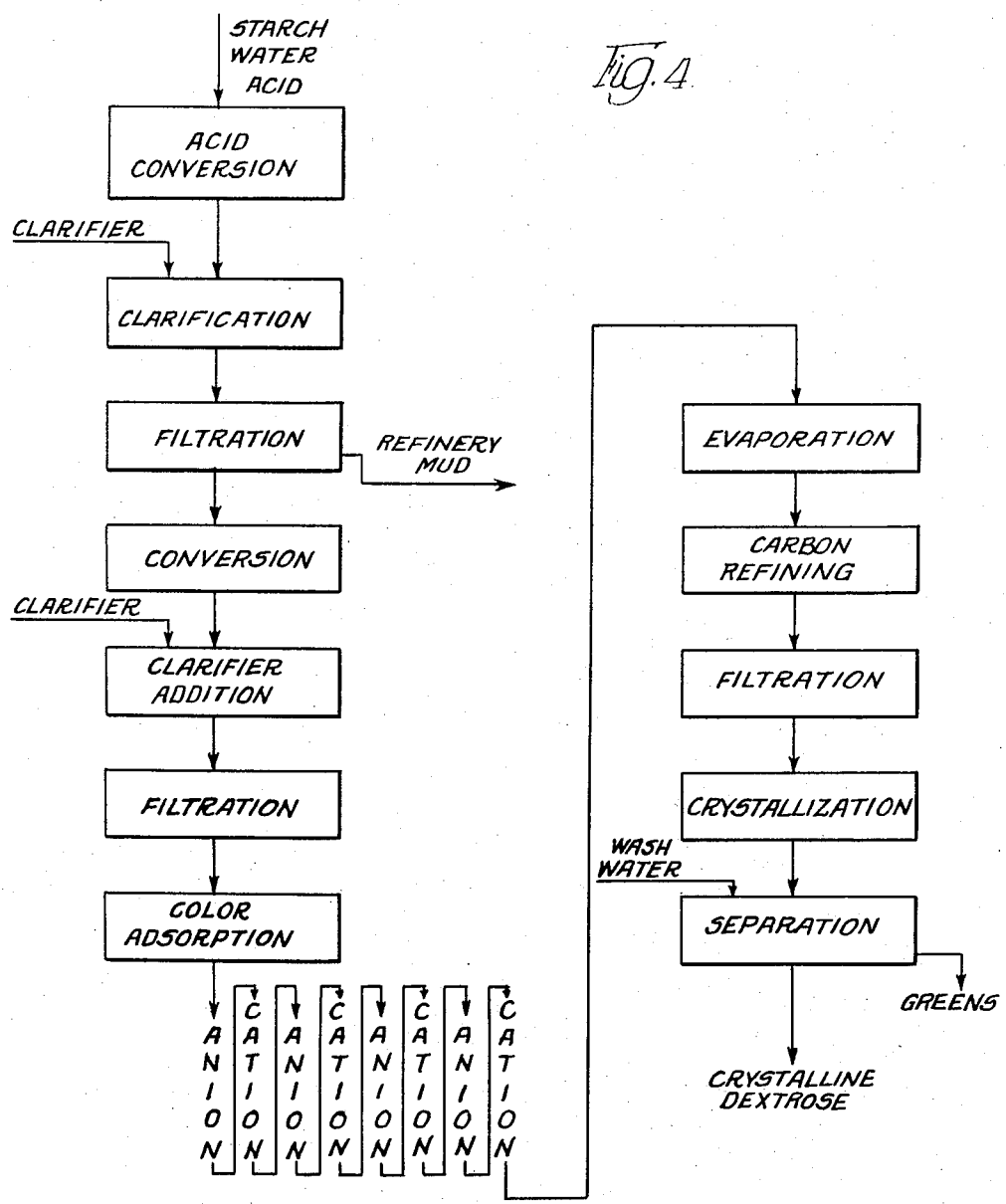

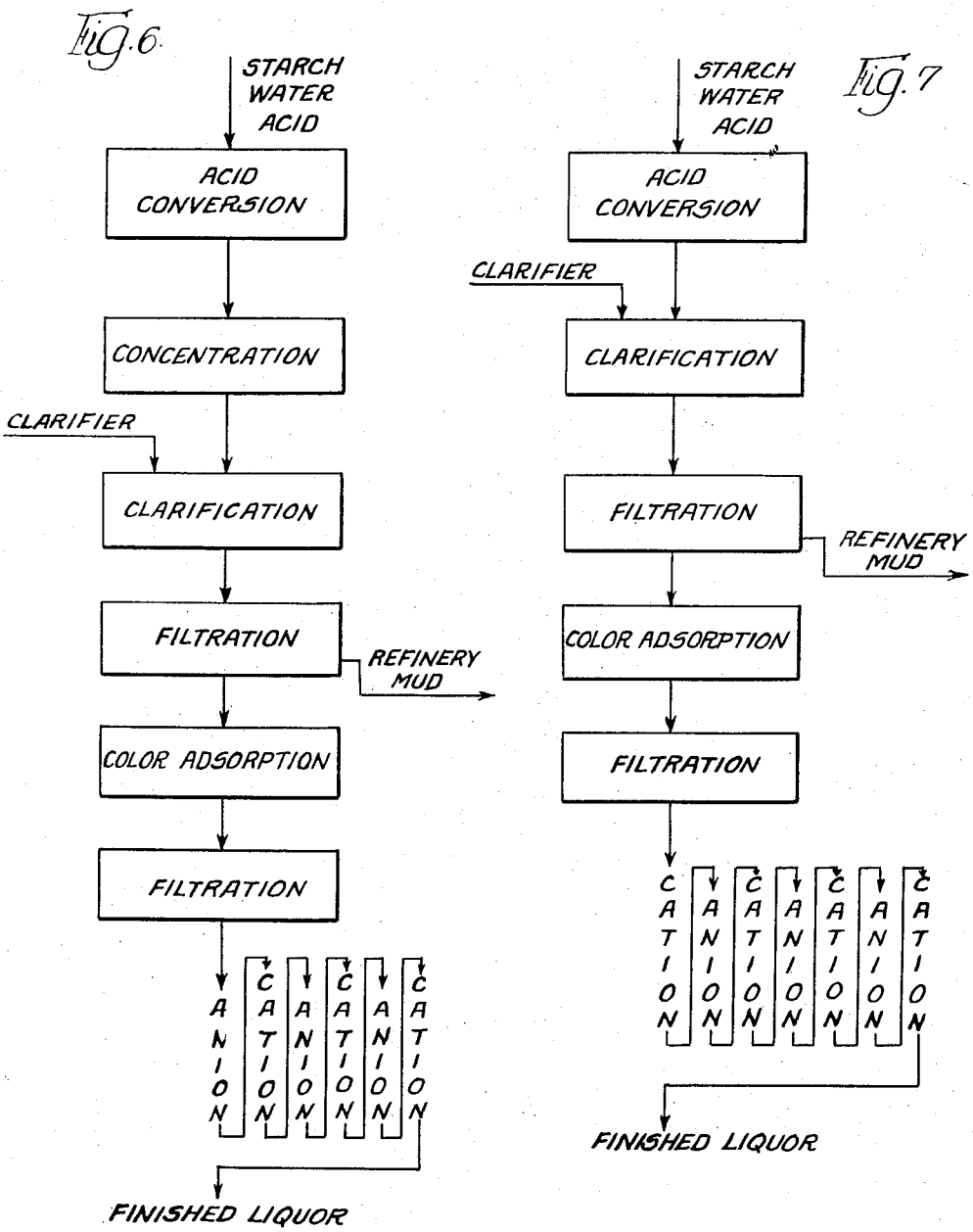

United States Patent Office 2,871,147
Patented Jan. 27, 1959

2,871,147

METHOD OF REFINING STARCH HYDROLYZATE LIQUORS

Clifford E. Smith, Decatur, Ill., assignor to A. E. Staley Manufacturing Company, Decatur, Ill., a corporation of Delaware Application November 24, 1954, Serial No. 470,985

14 Claims. (Cl. 127—40)

This invention relates, generally, to improvements and innovations in the refining of starch hydrolyzates in connection with the manufacture of syrups, crystalline dextrose, and solid sugar products therefrom. More particularly, the invention relates to the treatment of unneutralized (i. e. crude) acid-converted starch hydrolyzate liquors with certain clarifier substances which have the ability to precipitate or coagulate at least a large proportion of the colloidally dispersed impurities therein, without substantially increasing the pH values or adding to the mineral or ion content thereof, and without increasing the color or otherwise damaging the liquors. The resulting precipitated impurities may be readily and economically removed by a physical process such as skimming, settling, centrifugation, decanting or filtration.

In the corn refining industry large quantities of starch are converted into sugar both in the form of syrups (e. g. corn syrup) and in the form of solid sugar either as pure crystalline dextrose or solid sugar products rich in dextrose. While there are a number of special refinements and techniques employed in converting and processing starch into syrup and solid sugar products including crystalline dextrose, in general the starch is first converted with acid to a predetermined so-called "D. E. value" depending upon the type of sugar product to be produced. The expression "D. E. value" is commonly used and understood in the starch industry to designate the so-called "dextrose equivalent" of starch hydrolyzate liquors and syrups. If corn syrup is being produced by the conventional straight acid-conversion process, which may be carried out either continuously or as a batch operation, the conversion is carried out until the D. E. value is in the range of from about 25 to 60, depending upon the particular syrup being produced. If crystalline dextrose is being produced, then the conversion is carried to a much further degree (e. g. to a D. E. of about 90 or higher).

After a starch slurry has been acid-converted to the predetermined desired D. E., depending upon the final product to be produced, it is known and referred to in the art as acid-converted starch hydrolyzate liquor. Such liquors have a pH value in a range of about 1 to 3 and generally, in the narrower range of about 1.5 to 2. Conventionally, these acid-converted starch hydrolyzate liquors are neutralized by the addition of alkali (e. g. sodium carbonate) to a pH in the range of about 4.5 to 5. After neutralization and filtration the liquors are subjected to further refinement including treatment with color adsorbents such as adsorbent carbon and/or demineralization treatment with ion exchange resins. The resulting refined liquors are processed into syrup or crystalline dextrose in known manners.

In addition to the conventional straight acid process for manufacturing syrups from starch wherein acid alone is used to convert the starch, substantial quantities of extra sweet corn syrup are produced by the so-called "dual-conversion" process wherein starch is first only partially converted with acid and then converted to the final predetermined D. E. in a second step by means of an enzyme conversion. The "dual-conversion" process for producing extra sweet corn syrup is disclosed in Dale and Langlois Patent No. 2,201,609.

It is known that acid-converted starch hydrolyzate liquors contain substantial amounts of dissolved and colloidally dispersed impurities including salts, proteinaceous matter, fats and waxes. Such colloidally dispersed impurities are usually present in a range of about 2.0 to 3.0 percent D. S. B. (dry substance basis) in the liquor. One of the reasons for neutralizing the acid-converted starch hydrolyzate liquors in the conventional processes is to precipitate or, to use the term generally employed in the art, "knock down" a substantial portion of these colloidally dispersed impurities. The neutralized liquors are then filtered so as to remove the precipitated or flocculated impurities. While the conventional neutralization step serves to reduce the content of colloidally dispersed impurities, unfortunately it unavoidably increases the mineral and ion content of the starch hydrolyzate liquors. Furthermore, neutralization of the crude hydrolyzates promotes color development which is undesirable when the liquor is to be refined into syrup.

The mineral and ion content of the neutralized crude starch hydrolyzates is objectionable whether they are to be processed into crystalline dextrose or into syrup. Thus, when high dextrose content starch hydrolyzates are processed for the production of crystalline dextrose, it is common practice to demineralize the hydrolyzates in an ion exchange treatment in order to remove mineral matter which seriously interferes with and decreases the yield of crystalline dextrose. Therefore, the increase in mineral and ion content of the hydrolyzates as a result of the neutralization step greatly increases the load on the ion exchangers.

It is also current practice to demineralize the lower D. E. hydrolyzates in an ion exchange treatment in the production of non-crystallizing starch syrups (e. g. corn syrup). A primary object of this demineralization treatment is to stabilize syrup against color development which is sometimes referred to as "browning." Much of the mineral and ion material in the hydrolyzates is not detrimental insofar as color development is concerned. For example, the sodium chloride which naturally occurs in the syrup is not in itself detrimental to color. However, there has been no practical way of removing the weaker ionic materials (e. g. amino acids and buffer salts) which are detrimental to color without also removing the non-objectionable salts. Accordingly, any improvement or innovation which reduces the ion content of the crude hydrolyzate liquors prior to ion exchange demineralization will result in longer runs before exhaustion of the exchange resins and thereby improve the economy of the ion exchange treatment.

Previous consideration has been given to treating unneutralized acid-converted starch hydrolyzate liquors so as to remove acidic color-forming substances prior to treatment with color adsorbent materials such as activated carbon or ion exchange resins. Thus, in Patent No. 2,389,119 to Cantor the treatment of unneutralized acid-converted starch hydrolyzate liquor with bentonite is disclosed. It has been found, however, that treatment of such liquors with bentonite has several serious disadvantages which makes its use undesirable. More serious disadvantages may be summarized briefly as follows:

(1) Voluminous sludge is formed which loads up the filters rapidly and creates a disposal problem.

(2) Syrup dry substance must be recovered from the filter cake in order to avoid excessive dry substance syrup loss and this presents an extra processing step and problem.

(3) Bentonite clay is alkaline and will neutralize from 20 to 30 percent of the free acidity of the hydrolyzate liquors thereby adding undesirably to the cation content thereof.

(4) Bentonite imparts an "earthy" flavor to the hydrolyzate liquors which is not removed by any subsequent syrup refining processes.

(5) Bentonite has been reported to contain or tend to contain toxic mineral materials and therefore its use as a refining agent for a food product is of doubtful advisability.

(6) Bentonite will not consistently remove all colloidal material so as to preclude formation of cloudy syrup even after passage through ion exchange resins.

Briefly stated, the present invention is based on the discovery that when certain phosphatic substances or materials are added in the proper amounts to unneutralized acid-converted starch hydrolyzate liquors, they act as efficient clarifying agents to precipitate and flocculate a large proportion of the colloidal impurities naturally present in such liquors while adding very little if any additional mineral or ionic material thereto. The resulting floc or precipitate may be readily removed by such inexpensive physical processes as skimming, decanting, settling, centrifugation or filtration. The phosphatic clarifiers useful in accordance with the present invention do not have any of the foregoing disadvantages associated with bentonite or other untoward or undesirable effects.

Accordingly, the present invention provides a practical process and technique for removing colloidal impurities from starch-hydrolyzate liquors without prior neutralization as they come from the acid-conversion treatment. From a practical stand-point, the removal of these colloidal impurities is necessary before these hydrolyzate liquors can be demineralized in an ion exchange refining treatment, since, otherwise the ion exchange resins become quickly fouled with impurities. The removal of the colloidal impurities without neutralizing the hydrolyzate liquors, and therefore without increasing the mineral and ion content thereof, constitutes a very important advantage of the present invention.

Phosphatic materials which have been found to be particularly useful in accordance with the present invention as clarifying agents include sodium hexametaphosphate (widely known as and referred to by the name "Calgon"), phytic acid and salts thereof, sodium tetraphosphate available under the proprietary name "Quadrafos," sodium pyrophosphate and tetraphosphoric acid. These complex polyphosphates as a class may be considered to be molecularly dehydrated phosphates.

An important object of the present invention is an improved and economical method of removing colloidal and other impurities from unneutralized acid-converted starch hydrolyzate liquors without increasing the mineral or ion content thereof or neutralizing them to any material degree, thereby improving and conditioning such crude hydrolyzate liquors so that they are especially suitable for subsequent refining treatments, particularly ion exchange demineralization.

An important object of the invention is to improve and reduce the cost of refining acid-converted starch hydrolyzate liquors either into starch syrups, crystalline dextrose, or solid sugar products by treating such crude liquors with a clarifying agent selected from the group consisting of molecularly dehydrated phosphates whereby a substantial proportion of colloidal and other impurities in the hydrolyzates are precipitated and flocculated so that they may be readily removed by an inexpensive physical process such as filtration, decanting, skimming or centrifugation, the addition of such clarifiers being characterized by the fact that they do not increase the mineral or ion content of such hydrolyzates and do not neutralize the same to any substantial degree, if at all.

An important object of the invention is to greatly increase (usually about double or 100 percent) the through-put capacity of the ion exchange units used to demineralize acid-converted starch hydrolyzate liquors by first treating the crude unneutralized liquors with a phosphatic clarifier which causes a large portion of the colloidal impurities to precipitate and flocculate without increasing the mineral or ion content of such liquors and with appreciably neutralizing the same.

An important object of the invention is to eliminate and avoid the usual alkali neutralization of crude acid-converted starch hydrolyzate liquors with its attendant damage thereto and instead to "knock down" or precipitate the colloidally dispersed impurities in the crude liquor by treatment with a suitable phosphatic clarifier which does not increase the mineral or ion content of such crude liquors, does not appreciably neutralize the same, and does not impair the color or otherwise injure such liquors.

Certain other objects of the invention will, in part, be obvious and will, in part, appear hereinafter.

For a more complete understanding of the nature and scope of the invention, reference may now be had to the following detailed description thereof taken in conjunction with the accompanying drawings wherein the figures contain flow diagrams corresponding respectively to the following illustrative examples.

*Example 1*

This example covers the use of the present invention in connection with the production of corn syrup and will be described with reference to Fig. 1 of the drawings. Corn starch is acid-converted in known manner and in known equipment either by the batch technique or by the continuous conversion technique. In either case, corn starch, water and acid are introduced into the conversion equipment and steam is ordinarily employed as the source of heat for raising the temperature to the desired degree to hasten the rate of conversion. The conversion is carried out until the desired D. E. value of the hydrolyzate is obtained. This value will fall between about 25 and 60 when the product being made is a non-crystallizing syrup.

The acid-converted starch hydrolyzate liquor is withdrawn from the acid-conversion equipment at a temperature of about 180° F., a concentration of 18–19° Bé., and a pH in the range of about 1.5 to 2.0 into suitable mixing equipment into which there is also introduced about 0.1 percent of Calgon, based on the dry substance weight of the conversion liquor. The hydrolyzate liquor is stirred sufficiently so as to uniformly distribute the Calgon therein. The Calgon may advantageously and conveniently be added as a 20 percent solution. After the Calgon has been added, the conversion liquor is preferably allowed to cool to a temperature of about 100° F. while being stirred. It is sometimes advantageous to continue to stir the conversion liquor for a holding period of about 30 minutes after it is cooled to 100° F. before filtering. After the clarification treatment is complete, the hydrolyzate liquor, which is still at approximately the same acid pH that it came from the conversion stage, is filtered to remove as refinery mud the precipitate or floc which has been "knocked down" by the addition of the Calgon. Any suitable filter equipment may be employed for separating the precipitate from the hydrolyzate liquor and other means of physical separation may be employed such as settling, decanting, centrifugation or skimming.

In the case of a typical acid-converted starch hydrolyzate liquor having a pH in the range of about 1.5 to 2.0, the content of proteinaceous colloidal impurities subject to being precipitated may range from about 0.15 to 0.25 gram protein per 100 milliliters of liquor. The clarification treatment with Calgon will reduce this protein content to within the range of 0.05 to 0.06 gram per 100 milliliters of clarified liquor. Thus, assuming that crude starch-hydrolyzate liquors on the average contains approximately 0.2 gram protein in 100 milliliters, the clarification treatment with Calgon will precipitate approximately 75 percent or more of this impurity content.

After the filtration treatment, the clear acid-converted hydrolyzate liquor is subjected to further refining treatments known in the industry. Thus, the filtered liquor is given a color-adsorption treatment with a suitable color-adsorbent such as granular carbon (e. g. Darco granular carbon) or a color-adsorbing resin such as color-adsorbing resin S-30 of Chemical Process Co. (porous phenolic base resin) or Permutit D. R. (porous amine-formaldehyde resin). These color-adsorbents may be readily regenerated by residual alkalies from other steps in the process, with regeneration being finished with an acid wash.

Subsequent to the color-adsorption treatment the hydrolyzate liquor is filtered and passed through one or more pairs of anion-cation exchange units in series as shown in Fig. 1. In accordance with known ion exchange resin installations and operating techniques therefor, there will usually be several pairs of anion and cation exchangers (e. g. four pairs) with three of these pairs being onstream while a fourth pair is off-stream for regeneration. The most recently regenerated units will ordinarily be the furthest downstream.

These ion exchange units serve to demineralize and de-acidify the crude hydrolyzate liquor. After the liquor leaves the last cation exchange unit, it is finished liquor and in condition to be processed further in known manner into finished syrup.

*Example 2*

Referring to Fig. 2 of the drawings a process is outlined wherein the clarification treatment of the present invention is utilized in connection with the dual conversion process of manufacturing corn syrup. Corn starch is acid-converted in any one of the known procedures to a D. E. value of about 58. The unneutralized acid-converted liquor is subjected to a clarification treatment with a molecularly dehydrated phosphate clarifier such as Calgon as described in Example 1. Thereafter the precipitate or floc is separated by filtration and the filtrate subjected to a color-adsorption treatment as in the case of Example 1. After the color-adsorption treatment the liquor is given a treatment with anion exchange resin (e. g. Chemical Process Company's Duolite A-3, an aromatic polyamine resin) which serves to remove the acid thereof and raise the pH to about 4.5 to 6.0 Following the treatment with the anion exchange resin, the de-acidified liquor is evaporated to a concentration of about 30° Bé. and then it is enzyme-converted in known manner as described, for example, in the above-mentioned Dale and Langlois Patent No. 2,201,609. Following the enzyme conversion in which the D. E. value is raised to 66, the liquor is passed through a series of eight anion and cation ion exchange units arranged in the order ACACACAC. A fifth pair of anion-cation units is off-stream for regeneration. After passage through the last cation exchange unit, the finished liquor is ready to be processed into finished syrup in known manner.

*Example 3*

While the present invention is particularly useful in connection with a refining process wherein acid-converted starch hydrolyzate liquors are demineralized with ion exchange resins, the invention is also useful in connection with the refining of such liquors with activated carbon. Such an embodiment of the invention is illustrated in Fig. 3. Starch is given the usual acid-conversion and then treated with a clarifier, and filtered, as described in connection with Eaxmple 1, Fig. 1. The clear liquor is then refined with carbon in known manner and thereafter neutralized and filtered to produce finished liquor in condition for final refining into syrup. In this example, the use of acid-washed carbon lessens the tendency towards haze formation. However, if haze formation should be a problem, it can be readily overcome by interposing a cation exchange unit in the line, preferably after one of the usual two or more carbon refining steps. The cation exchange unit serves to remove such metals as calcium and iron which give rise to haze formation. Such a cation exchange resin may be operated either on an $H^+$ or $Na^+$ cycle. A suitable resin for this purpose is Chemical Process Company's Duolite C-3, a phenolic methylene sulfonic acid resin.

*Example 4*

It was mentioned above that an important use of the present invention is in connection with the production of crystalline dextrose from starch hydrolyzate liquors. Referring to Fig. 4 wherein such an embodiment of the invention is illustrated, starch is first acid-converted to a relatively low D. E. (e. g. 30 to 40) and then is treated with the phosphate clarifier and filtered as described above in connection with Fig. 1. The clear liquor is then further converted to the sugar range (i. e. 90 D. E. or more) and then preferably again treated with phosphate clarifier and filtered.

Materially improved results are obtained by having two separate acid-conversion stages, each of which is followed by a clarification treatment. Thus, the time required for converting the starch in the preliminary conversion to the low D. E. range is comparatively short, e. g. about 10 minutes, whereas the conversion time required to reach the sugar range of 90 D. E. or more requires as much as an hour. By removing gluten and other proteinaceous material after the short preliminary acid-conversion, the damaging action on such materials which occurs during acid-conversion is avoided or minimized and also continued hydrolysis of these materials is avoided. Thus, if gluten and other proteinaceous material associated with the starch is allowed to remain in the converter or autoclave for a prolonged period, some of the initial insoluble protein material becomes soluble through hydrolysis. This solubilized protein material not only is damaging to the sugar liquor during the relatively intensive conversion but it is also the type of impurity which must be subsequently removed by adsorption in the refining system, i. e. on carbon or on the resins of an ion exchange system. It will, of course, be appreciated that the acid-conversion could be carried out in more than two steps with interposed clarification treatments, but for practical purposes two stages of conversions will usually be entirely satisfactory.

Following the last clarification treatment and filtration, the clear liquor is passed through a color adsorber, such as granular carbon or a suitable color-adsorbing resin and then it is passed through a series of anion-cation ion exchange units in the order ACACACAC. The effluent from the last cation exchange unit is then evaporated, carbon-refined, filtered and then introduced into the crytsallization equipment. The crystals are separated as by centrifugation and then washed and dried to produce crystalline dextrose.

*Example 5*

In each of the foregoing examples, the phosphatic clarifier is added to the crude avid-converter liquor after it has been removed from the converter. It is also feasible to add the phosphatic clarifier at the beginning of or during the conversion reaction itself. Thus, in Fig. 5 the clarifier, e. g. Calgon, is introduced into the converter along with the starch, water and acid. After the conversion has progressed to the desired D. E., the contents of the converter are filtered and the filtrate then is processed as described above in connection with Fig. 1.

While the phosphatic clarifier will precipitate the impurities as well in the conversion stage as in a separate step, the presence of the clarifier may retard the rate of the acid-conversion reaction. For example, when 0.1 percent Calgon is added as the clarifier in the acid-conversion stage, it requires approximately 23 percent more conversion time to reach a given D. E. value than when the clarifier is absent.

*Example 6*

This example, illustrated in Fig. 6, corresponds to Example 1 described above in connection with Fig. 1 except that prior to the clarification treatment the crude acid-converter liquor is concentrated by evaporation to about 30° Bé. Thereafter when the same amount of Calgon on a dry basis is added (i. e. 0.1 percent D. S. B.) the knock-down was about 18 percent more than that obtained when the clarification is carried out at 18–19° Bé. in Example 1, Fig. 1. Accordingly, it is possible to increase the efficiency of the clarification treatment in this manner.

*Example 7*

This example corresponds to Example 1 above described in connection with Fig. 1 but the order of the ion exchange resin units is reversed to CACACA as shown in Fig. 7. While the process may be satisfactorily carried out with the ion exchange units arranged in this order, it is generally preferred to have the anion exchange units first and to finish off the liquor with a cation exchange unit last. With this preferred arrangement (i. e. anion exchange unit first and cation exchange unit last) the system tends to give longer runs and therefore makes for lower operating costs. Furthermore, it is advantageous to finish off the liquor with a cation exchange unit last, particularly in corn syrup refining, as discussed in Smith and Olson Patent No. 2,490,716.

In the foregoing examples any of the conventional ion exchange resins which are commonly used to demineralize and refine various aqueous liquids may be used. For example, suitable anion exchange resins include: a melamine type resin (e. g. Ionac A–300, American Cyanamid); an aliphatic polyamine resin (e. g. Permutit De-Acidite); aromatic polyamine resins (e. g. Chemical Process Company's Duolite A–3, Duolite A–4, or Duolite A–6); and aromatic polyamine resins containing essentially primary amine groups (e. g. Rohm and Haas Amberlite IR–4B).

The cation exchange resins may be operated either on a H+ or Na+ cycle and representative cation exchange resins include: sulfonated polystyrene resins (e. g. Dowex-50, Permutit Q, National Aluminate Nalcite HCR, or Rohm and Haas Amberlite IR–120 and Amberlite IR–100); a phenolic methylene sulfonic acid resin (e. g. Chemical Process Company's Duolite C–3 or American Cyanamid Company's Ionac C–200); and sulfonated coal (e. g. Permutit Company's Zeocarb H).

It will be understood that a number of modifications may be made in the illustrative embodiments described in the foregoing examples in connection with the corresponding flow diagrams of the drawings. For example, instead of using Calgon (i. e. sodium hexametaphosphate) as the clarifier, other molecularly dehydrated phosphate clarifiers may be used such as sodium tetraphosphate (e. g. Rumford Chemical Company's Quadrafos), sodium pyrophosphate, tetraphosphoric acid, phytic acid, and the sodium and calcium salts of phytic acid. These other molecularly dehydrated phosphate clarifiers have approximately the same efficiency as Calgon on a weight basis.

Because of its greater commercial importance, corn starch is generally used in the production of starch conversion syrups and crystalline dextrose. However, other starches may also be employed such as wheat starch and potato starch and other starches which are not at this time as commercially important as corn starch.

It has been found that in practicing this invention the concentration of the unneutralized or crude acid-converted starch hydrolyzate liquors may range from about 20 to 55 percent solids.

Since the invention may be practiced in a number of different embodiments besides the examples described above and a number of changes may be made in addition to those mentioned, without departing from the spirit and scope of the invention, all matter described above or shown in the accompanying drawings is intended to be interpreted as illustrative and not in a limiting sense.

What is claimed as new is:

1. The method of clarifying unneutralized acid-converted starch hydrolyzate liquors at a pH in the range of about 1 to 3 which comprises reacting such a liquor with a fraction of one percent dry substance basis of a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid, and separating the resulting precipitate from the liquor.

2. In the process of refining unneutralized acid-converted starch hydrolyzate liquor at a pH in the range of about 1 to 3, the improvement which comprises reacting such a liquor with a fraction of one percent dry substance basis of a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid prior to additional refining treatment.

3. The process of refining unneutralized starch hydrolyzate liquor at a pH in the range of about 1 to 3 which comprises acid-converting starch to a preliminary predetermined D. E. value, reacting the resulting acid-converted starch hydrolyzate liquor with a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid, separating the resulting precipitate from the liquor, subjecting the liquor to at least one more acid-conversion step followed in each instance by reaction with a phosphate clarifier selected from said group and separation of the resulting precipitate, and demineralizing the finally converted and clarified liquor with ion exchange resin.

4. In the process of making refined starch hydrolyzate liquor, the improvement which comprises acid-converting starch at a pH in the range of about 1 to 3 in the presence of a fraction of a percent dry substance basis of a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid.

5. In the process of making refined starch hydrolyzate liquor, the improvement which comprises concentrating acid-converted starch hydrolyzate liquor to substantially increase the solids content thereof, reacting the unneutralized concentrated liquor at a pH in the range of about 1 to 3 with a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid, and separating the resulting precipitate from the liquor.

6. The method of clarifying unneutralized acid-converted starch hydrolyzate liquors at a pH in the range of about 1 to 3 which comprises reacting such a liquor with a fraction of one percent dry substance basis of sodium hexametaphosphate and separating the resulting precipitate from the liquor.

7. In the process of refining unneutralized acid-converted starch hydrolyzate liquor at a pH in the range of about 1 to 3, the improvement which comprises reacting such a liquor with a fraction of one percent dry substance basis sodium hexametaphosphate prior to additional refining treatment.

8. The process of refining starch hydrolyzate liquor which comprises acid-converting starch to a preliminary predetermined D. E. value, reacting the resulting unneutralized acid-converted starch hydrolyzate liquor at a pH in the range of about 1 to 3 with sodium hexametaphosphate, separating the resulting precipitate from the liquor, subjecting the liquor to at least one more acid-conversion step followed in each instance by reaction with sodium hexametaphosphate and separation of the resulting precipitate, and demineralizing the finally converted and clarified liquor with ion exchange resin.

9. In the process of making refined starch hydrolyzate liquor, the improvement which comprises acid-converting starch at a pH in the range of about 1 to 3 in the presence of a fraction of a percent dry substance basis of sodium hexametaphosphate, and separating the resulting precipitate from acid-converted liquor.

10. In the process of making refined starch hydrolyzate liquor, the improvement which comprises concentrating acid-converted starch hydrolyzate liquor to substantially increase the solids content thereof, reacting the unneutralized concentrated liquor at a pH in the range of about 1 to 3 with sodium hexametaphosphate, and separating the resulting precipitate from the liquor.

11. In the process of refining acid-converted starch hydrolyzate liquor the improvement which comprises reacting such a liquor in the unneutralized state while at a temperature of at least about 180° F., a pH in the range of about 1 to 3 and a solids concentration of about 20 to 55 percent by weight dry basis with about 0.1 percent dry substance basis of a phosphate clarifier selected from the group consisting of sodium hexametaphosphate, phytic acid, sodium salts of phytic acid, calcium salts of phytic acid, sodium tetraphosphate, sodium pyrophosphate, and tetraphosphoric acid, cooling the liquor with agitation to at least about 100° F., and separating the resulting precipitate from the liquor prior to demineralizing the clarified liquor with ion exchange resin.

12. In the process of refining acid-converted starch hydrolyzate liquor the improvement which comprises reacting such a liquor in the unneutralized state while at a temperature of at least about 180° F., a pH in the range of about 1 to 3 and a solids concentration of about 20 to 55 percent by weight dry basis with about 0.1 percent dry substance basis of sodium hexametaphosphate, cooling the liquor with agitation to at least about 100° F., and separating the resulting precipitate from the liquor prior to demineralizing the clarified liquor with ion exchange resin.

13. In the process of making crystalline dextrose the steps which comprise, acid-converting starch to a D. E. in the range of about 30 to 40, reacting the resulting unneutralized acid-converted starch hydrolyzate liquor at a pH in the range of about 1 to 3 and an elevated temperature with approximately 0.1 percent by weight of sodium hexametaphosphate, separating the resulting precipitate from the liquor, acid-converting the clarified liquor to a D. E. of at least about 90, reacting the resulting high D. E. hydrolyzate liquor at elevated temperature with approximately 0.1 percent of sodium hexametaphosphate, separating the resulting precipitate from the high D. E. liquor, and demineralizing the clarified high D. E. liquor with ion exchange resin.

14. The improvement called for in claim 5 wherein said acid-converted starch hydrolyzate liquor is concentrated to approximately 30° Bé.

References Cited in the file of this patent

UNITED STATES PATENTS

| | | |
|---|---|---|
| 557,643 | Bielmann | Apr. 7, 1896 |
| 2,075,127 | Mead | Mar. 30, 1937 |
| 2,414,969 | Moose | Jan. 28, 1947 |
| 2,606,847 | Newkirk et al. | Aug. 12, 1952 |
| 2,680,082 | Newkirk | June 1, 1954 |